(No Model.)
O. R. & G. B. HANCHETT.
PLOW ATTACHMENT.
No. 322,443.   Patented July 21, 1885.
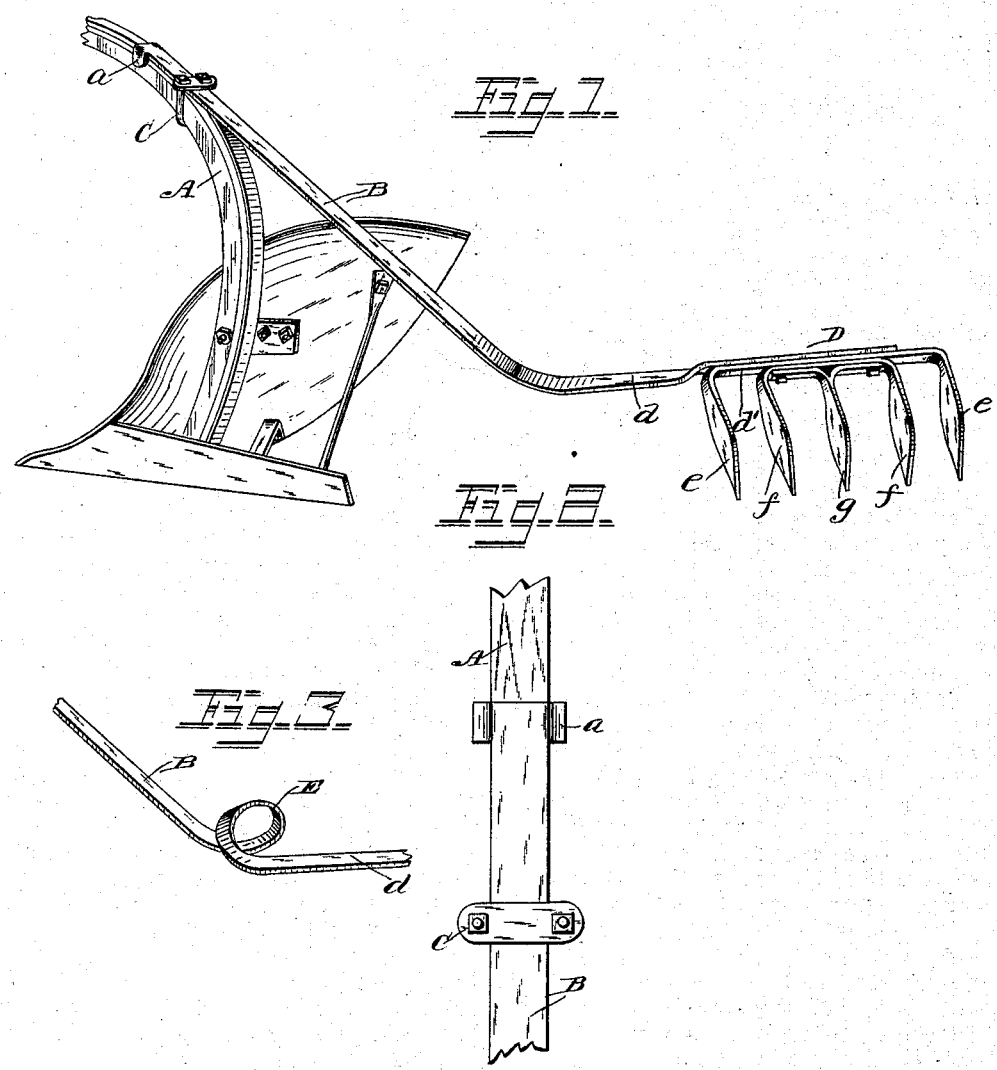

UNITED STATES PATENT OFFICE.

ORANGE R. HANCHETT AND GEORGE B. HANCHETT, OF WICHITA, KANSAS.

PLOW ATTACHMENT.

SPECIFICATION forming part of Letters Patent No. 322,443, dated July 21, 1885.

Application filed May 14, 1885. (No model.)

*To all whom it may concern:*

Be it known that we, O. R. HANCHETT and G. B. HANCHETT, citizens of the United States of America, residing at Wichita, in the county of Sedgwick and State of Kansas, have invented certain new and useful Improvements in Plow Attachments, of which the following is a specification, reference being had therein to the accompanying drawings.

Our invention relates to an improvement in harrows for attachment to plows; and it consists in the combination and arrangement of the parts, substantially as hereinafter more fully shown and described.

In the accompanying drawings, Figure 1 is a view in perspective showing our plow attachment. Fig. 2 is a detail plan view thereof; and Fig. 3 is a detail perspective view of a modified form of our invention.

In the construction of our harrow attachment to plows we secure to the plow-beam A the harrow-beam B by means of the nutted clip C, the harrow-beam B being provided with pendent lips $a$, which lips project down and against the two vertical sides of the plow-beam, as clearly shown, and when the harrow-beam is thus clipped to the plow-beam it is held securely in position and cannot be shifted out of such alignment with the plow-beam.

The harrow consists of a right-angular metallic beam B, which projects out longitudinally from the plow-beam, to which it is attached, and it inclines downward from the plow-beam at a slight angle, and after it has reached the point of its lowest declination it is projected at right angles to its forward longitudinal end. To the right-angular arm $d$ of the harrow-beam the teeth D are rigidly secured. The outer teeth, $e$, are integral with their connecting-bar $d'$, which bar is rigidly secured to the harrow-beam. The teeth $f$ are disposed between the teeth $e$, as shown, and also have a connecting-bar integral therewith, and the central tooth, $g$, is T-shaped; and this method of constructing and arranging the harrow-teeth admits the three distinct parts comprising them being rigidly bolted to the harrow end of the harrow-beam through suitable corresponding orifices therein provided, and it also admits the removal and substitution, when broken, of one of the parts comprising the series of teeth, which series may be in number more or less than shown. The harrow-beam B may be coiled at the point of its lowest declination, forming a spring, E, which serves to greatly increase the elasticity with which the harrow rakes the soil; and this may also be adjusted to a very considerable extent by sliding forward the clip C at the point of curvature of the plow-beam, and the harrow may also be adjusted by inclining or tipping the plow to the right or left.

Our harrow attachment to plows, constructed as shown, may be attached to almost any kind of plow, and when brought into contact with corn-hills and other rigid obstructions the bar will spring sufficiently to pass over the same and pass on.

Having thus fully described our invention, what we claim, and desire to secure by Letters Patent, is—

The combination of the right-angular harrow-beam B, having lips $a$, the clip C, and the teeth D, substantially as shown, and for the purpose described.

In testimony whereof we affix our signatures in presence of two witnesses.

ORANGE R. HANCHETT.
GEORGE B. HANCHETT.

Witnesses:
WESLEY S. MORRIS,
E. B. JEWETT.